April 17, 1956 W. H. KENSMOE 2,741,935
SAW SET
Filed June 15, 1950
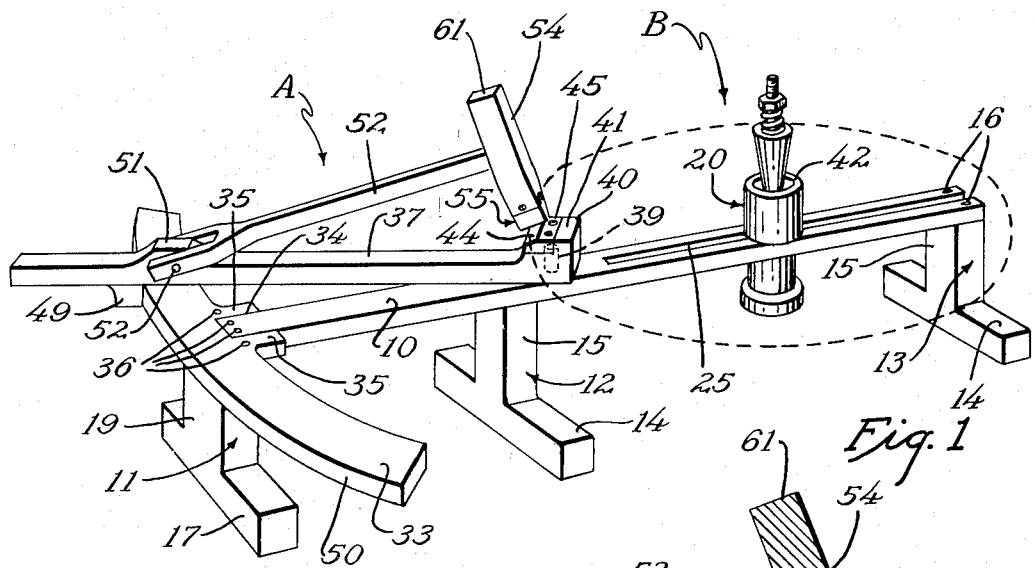
*Fig. 1*
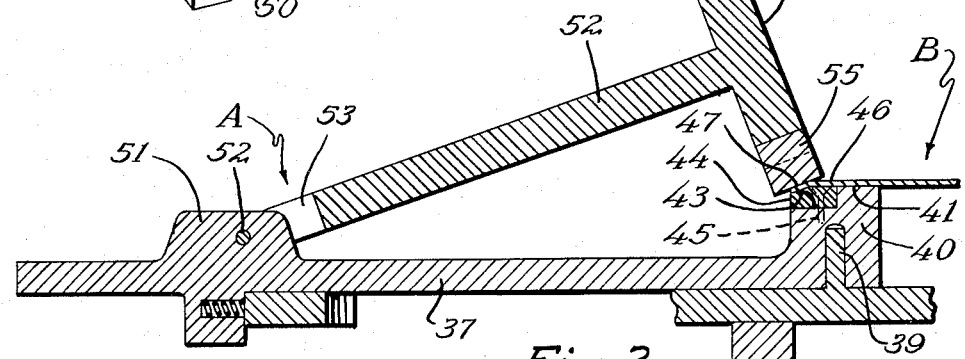
*Fig. 2*
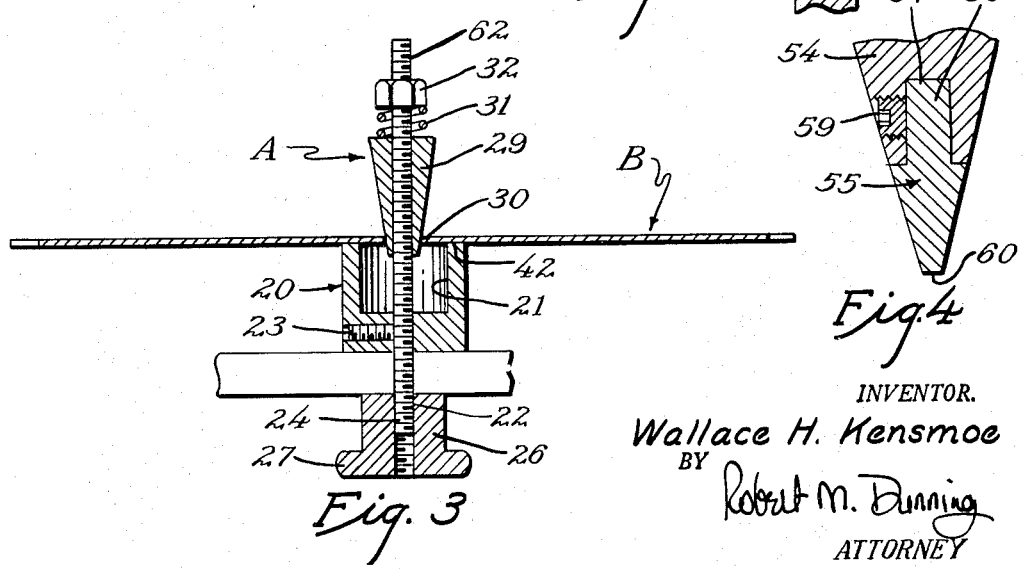
*Fig. 3*
*Fig. 4*
INVENTOR.
Wallace H. Kensmoe
BY Robert M. Dunning
ATTORNEY

2,741,935

SAW SET

Wallace H. Kensmoe, St. Paul, Minn.

Application June 15, 1950, Serial No. 168,211

3 Claims. (Cl. 76—65)

My invention relates to an improvement in saw set wherein it is desired to provide a simple and effective mechanism for properly bending the teeth of a circular saw.

Various types of saw sets have been produced. Certain of these devices include a means for supporting the circular blade so that an edge thereof overlies an anvil or mandrel and these devices also include some means of bending the teeth at the desired angle. The present device differs from previous structures in certain structural features and also in added adjustments which permit a somewhat more accurate bending of the teeth.

An object of the present invention lies in the provision of a saw set which is adjustable to fit circular saws of varying diameters. The saw set supports the saw to overlie an anvil or mandrel. This mandrel is mounted upon an arm pivot about a vertical pivot. The arm supports a hammer or setting apparatus which is mounted at all times in proper angular relation to the anvil. Thus the angle of bend between the teeth and the body of the system may be varied.

A feature of the present invention resides in the provision of a simple saw set which can be produced at low cost and sold in volume. The structure is so arranged that it may be dismantled and shipped in an extremely small package, thereby simplifying the shipping and storage problems. My device is so arranged that the angle of bend between each individual tooth and the blade may be easily varied. My device is also so arranged that the angle of bend may be readily duplicated so that a similar angle of bend may be formed on various blades.

These and other objects and novel features of my invention will be more clearly and fully set forth in the following specification and claims.

In the drawings forming a part of my specification:

Figure 1 is a perspective view of my saw set showing the construction thereof.

Figure 2 is a cross sectional view through a portion of the device showing the construction thereof.

Figure 3 is a cross sectional view through the saw supporting structure showing the construction thereof.

Figure 4 is a sectional view through the rear of the hammer showing the manner in which the tip of the hammer may be changed if desired.

The saw set is indicated in general by the letter A and is designed to set the teeth of a circular saw blade which is indicated in general by the letter B. The saw blade B may be of any diameter within reasonable limits and the teeth may be of any desired shape or form. The purpose of the saw set is to bend alternate teeth of the saw in opposite directions out of the plane of the saw or to serve the normal purposes of a device of this type.

The saw set A includes an elongated platform 10 which is supported by a series of standards 11, 12 and 13. The standards 12 and 13 are shown as being similar in shape, each of these standards including a transversely extending foot or base 14 and a center upright 15 secured thereto to extend upwardly therefrom. A pair of countersunk screws or bolts 16 are designed to extend through the platform 10 to secure the platform to each of the standards 12 and 13.

The standard 11 is similar in form to the standards 12 and 13 as it includes a foot or base 17 and an upright standard portion 19 projecting vertically therefrom. The upright portion 19 of the standard 11 is somewhat wider than the upright portions 15 of the standards 12 and 13 as this standard 11 is preferably designed to extend beyond the side edges of the platform.

In order to hold the saw blade B in place the structure best illustrated in Figure 3 of the drawings is employed. This structure includes a cylindrical support 20 designed to rest upon the platform 10. The support 20 is provided with an axial recess 21 in its upper surface. An elongated threaded shank 22 extends through the support 20 in a direction axially thereof. A set screw 23 may if desired engage against the threaded shank 22 to hold this shank from rotation relative to the support 20. Alternatively the shank 22 may be integral with the support 20 and may be provided with threaded ends.

The shank 22 projects above and below the support 20 as best illustrated in Figure 3. The downwardly projecting end 24 of the shank 22 extends through a longitudinal slot 25 in the table 10. The shank portion 24 is designed to accommodate a threaded collar 26 provided with an enlarged lower end 27 by means of which the collar may be readily rotated. The collar 26 thus acts as a clamping nut for clamping the shank 22 in any desired position longitudinally of the groove 25.

A cone shaped clamping member 29 is engageable into the central aperture 30 of the saw blade B. The tapered form of the clamp 29 is provided so that the device may properly engage saw blades having central apertures of various sizes. A spring 31 overlies the clamping member 21 and is held in place by a nut 32. The nut 32 may if desired be a wing nut, or may be a member similar to the threaded collar 26.

An arcuate arm 33 is secured to an end of the platform 10 to overlie the standard 11. The arcuate arm 33 extends an equal distance on each side of the platform 10 and is centrally notched as indicated at 34 to accommodate the end of the platform 10. The arcuate arm is enlarged at its center point to provide wings 35 on opposite sides of the arm 10 so as to be maintained in a proper position. Recessed bolts or screws 36 extend downwardly through the arm 33 and through the end of the platform 10 into the upright portion 19 of the standard 11 to hold these parts assembled.

An arm 37 is pivotally supported on a vertical pivot pin 39 extending upwardly from the table 10. The arm 37 is enlarged in depth near the pivoted end as indicated at 40, the upper surface 41 of the enlargement 40 being on the same level as the upper surface 42 of the saw support 20. Thus the saw B supported upon the support 20 will rest upon the upper surface 41 of the enlargement 40 and be further supported thereby. The upper surface 41 is notched along its outer edge as indicated at 43. An anvil 44 or mandrel is secured in the notch by recessed screws or bolts 45. The anvil 44 is preferably provided with a flat portion 46 which extends flush with the upper surface 41 of the enlargement 40 and is also provided with an inclined surface 47 which is inclined from the plane of the upper surface 46. The angle of the inclined surface 47 may vary with saws of different types and accordingly the anvil 44 is so constructed that it may be removed and replaced with a similar anvil having an inclined surface 47 arranged at a greater or lesser angle relative to the flat surface 46. The arm 37 is provided with a lug 49 which engages outwardly of the arcuate outer surface 50 of the arm 33 to guide the arm in its pivotal movement about the pivot 39. The arm 37 is likewise provided with an upwardly projecting lug 51.

A hammer or saw bending device includes an arm 52 having a bifurcated end 53 which straddles the lug 51 and is pivotally connected thereto at 52. The pivot 52 is arranged at right angles to a radius from the pivot support 39 so that the arm 52 may swing toward or away from the arm 37. The hammer device includes a head 54 which is provided with a removable tip 55.

As best illustrated in Figure 4 of the drawings the tip 55 is provided with a tongue 56 which extends into a groove 57 in the hammer head 54. A set screw 59 may be provided for holding the tip 55 in place. The tip 55 is provided with a flattened end 60 which is arranged on an angle corresponding with the angle of the inclined surface 47. When the anvil 44 is changed, the tip 55 is also preferably changed so that the end surface 60 of the tip is at the same angle as the inclined surface 47 of the anvil.

The hammer head 54 is provided with a flattened upper end 61 which may, if desired, be struck with a hammer or similar tooth bending tool. In other words, the hammer device illustrated may either be swung down forcibly against the saw tooth or else may be placed carefully against the saw tooth and the upper end 61 of the device struck with a hammer or similar percussion tool.

The operation of my device is believed clear from the foregoing description. The saw blade B is placed upon the support 20 encircling the upwardly projecting end 62 of the threaded shank 22. The cone shaped clamp 29 is next placed about the shank 22 with its lower small diameter end projecting into the aperture 30 in the saw blade. The spring 39 is next placed above the clamp 29 and the nut 32 is tightened sufficiently to hold the saw blade B in place. This structure supports the saw firmly, but at the same time permits rotation of the system with the cone shaped clamp 29 about its axis.

The edge of the saw blade B is next adjusted to overlie the inclined surface 47 of the anvil or mandrel 44. This is accomplished by moving the saw and the support longitudinally of the platform 10. The collar 26 is tightened to hold the saw centered at the desired point.

The arm 37 is next pivoted about its pivot 39 to provide the desired angle of bend between the saw tooth and the body of the saw. This angle may vary with blades of different types as well as with blades of different diameters. When the arm 37 has been properly positioned the arm 52 is swung down so that the tip 55 engages the tooth to be bent. The teeth to be bent downwardly against the anvil 44 are thus bent either by the force of downward movement of the hammer member or else the head of the hammer is placed upon the tooth and the upper end of the hammer is struck with a suitable tool.

When the desired teeth have been bent downwardly in the manner described the saw blade B is inverted and the same operation is continued to bend teeth in the opposite direction. When the teeth are being bent in one direction, the arm 37 is usually angled on one side of the table 10 and when the saw blade is inverted to bend the teeth in the opposite direction, the arm 37 is ordinarily angled an equal distance on the opposite side of the platform 10. The arm 33 may be provided with spaced gage marks to facilitate this action.

In accordance with the patent statutes, I have described the principles of construction and operation of my saw set construction and while I have endeavored to set forth the best embodiment thereof, I desire to have it understood that obvious changes may be made within the scope of the following claims without departing from the spirit of my invention.

I claim:

1. A saw set comprising in combination an elongated platform supported in horizontal position by a series of standards, two of said standards being positioned at the ends of said platform and one standard intermediate the ends of said platform, arcuate wing arms secured to one end of said platform and to overlie one of said standards and extend on opposite sides thereof, a vertical pin mounted on said platform intermediate the ends thereof and supported by said intermediate standard, a pivot arm carrying an anvil mounted thereon and pivotal therewith supported at one end by said pivotal pin, and at its opposite end by said accurate wing arms, lug means on said arm engaging said arcuate arms to guide said pivotal arm in its pivotal movement about said pivot pin and carrying said anvil in a relatively constant arc about said pivot pin, an upwardly projecting lug on said arm adjacent said lug means, a hammer arm carrying a head pivotally mounted to said lug to uniformly swing and position said head in striking relationship to said pivotal anvil, the opposite end of said platform being provided with an elongated slot therethrough having its one end supported by its relative standard and its opposite end ending adjacent said pin, and an adjustable stud element extending through said slot and carrying a conical wedge member for mounting a saw over said platform and in adjusted striking relationship with the uniform swing of said hammer and the pivotal position of said anvil.

2. The structure of claim 1 wherein the said hammer head carried by said uniformly pivotal arm is replaceable.

3. The structure of claim 1 wherein the hammer head carried by said uniformly pivoted arm and the pivotal anvil are replaceable.

References Cited in the file of this patent

UNITED STATES PATENTS

| Number | Name | Date |
| --- | --- | --- |
| 120,542 | Shaw | Oct. 31, 1871 |
| 143,447 | Grimes | Oct. 7, 1873 |
| 217,850 | Barber | July 29, 1879 |
| 325,101 | Markham | Aug. 25, 1885 |
| 352,802 | Blackmer | Nov. 16, 1886 |
| 472,865 | Drake | Apr. 12, 1892 |
| 483,793 | Smith | Oct. 4, 1892 |
| 633,725 | Mahar | Sept. 26, 1899 |
| 775,035 | Hakes | Nov. 15, 1904 |
| 831,693 | Wismar | Sept. 25, 1906 |
| 1,416,374 | Morin | May 16, 1922 |
| 1,531,503 | Reynolds | Mar. 31, 1925 |
| 1,971,983 | Jirka | Aug. 28, 1934 |
| 2,115,712 | Gavin | May 3, 1938 |
| 2,459,233 | Mall | Jan. 18, 1949 |
| 2,463,007 | Wheeler | Mar. 1, 1949 |
| 2,580,812 | McEwan | Jan. 1, 1952 |